May 30, 1961 F. W. R. FARROW 2,986,670
CONSTRUCTION OF THERMIONIC VALVES
Filed May 5, 1959

INVENTOR
FREDERIC WILLIAM RODBARD FARROW
BY Larson and Taylor

United States Patent Office 2,986,670
Patented May 30, 1961

2,986,670

CONSTRUCTION OF THERMIONIC VALVES

Frederic William Rodbard Farrow, Enfield, England, assignor to Siemens Edison Swan Limited, London, England, a British company Filed May 5, 1959, Ser. No. 811,211

Claims priority, application Great Britain May 5, 1958

1 Claim. (Cl. 313—261)

This invention relates to the construction of thermionic valves. It is concerned with the electrode assemblies of such valves.

When constructing the electrode assemblies of thermionic valves it is often necessary to accurately align the grids of the valves relative to each other in an axial direction. After such alignment one end of each grid is fixed by welding to clips secured to the mica supports provided at either end of the assembly. When welding it is difficult to avoid slight inadvertent movement of the grids and once the grids are welded no axial movement to correct this error is possible.

It is an object of the present invention to provide an improved method of fixing the grids which allows for accurate alignment to be maintained.

According to the present invention a thermionic valve grid is secured to an insulating support disc by means of straps extending between the grid support rods and posts firmly secured to said disc, which straps are welded to said posts and said rods, and wherein the straps are sufficiently ductile to allow the grid to be moved slightly in an axial direction subsequent to welding.

The grid support rods are normally welded to the posts and are aligned after the welds have been completed. Thus any slight movement of the grid during welding does not affect alignment.

In order that the invention may be more fully understood reference will now be made to the accompanying drawing, in which.

Figure 1:
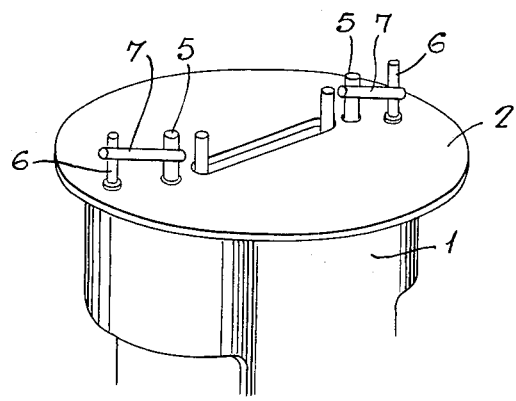
Fig. 1 shows one embodiment of the invention in perspective.
Figure 2:
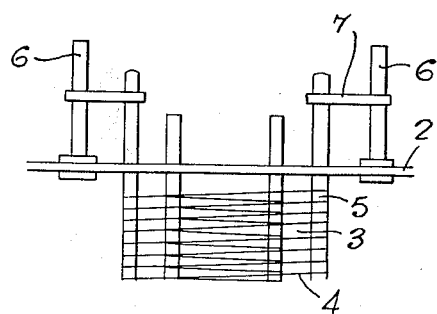
Fig. 2 shows a side elevation of the embodiment of Fig. 1.

Referring now to Figs. 1 and 2 an electrode assembly 1 is shown secured to a mica disc 2 at one end thereof. The assembly is secured to a similar disc at its other end. The method according to one embodiment of securing to the mica disc an individual grid 3 comprising a fine helical wire 4 wound between two parallel support rods which extend through the mica 2 is as follows. Posts 6 are firmly secured to the mica disc 2 at positions close to the ends of support rods 5. The support rods 5 are then secured to the posts by means of straps 7 welded at one end to posts 6 and the other end to support rods 5. The straps are sufficiently ductile to allow the grid to be moved slightly in an axial direction subsequent to welding. The straps 7 are preferably of circular cross-section.

In constructing and aligning an electron assembly one grid is first fixed by any convenient means and another grid is then secured in the manner described above, and then this latter grid is accurately aligned with respect to the first grid by means of tweezers gripping either the support rods 5 themselves or the straps 7 adjacent the support wires. The straps are sufficiently ductile to allow the small amount of movement necessary for alignment but are rigid enough to therafter hold the grid firmly in the aligned position.

What I claim is:

An electrode assembly for a thermionic valve including, a grid, said grid comprising a pair of grid support rods and a grid wire wound therearound, a pair of insulating discs, one of said discs being disposed at each end of the grid, a pair of posts secured to each of said discs, flexible straps extending between and welded to the posts and the grid support rods to support the grid, said flexible straps having substantially circular cross-sections and having sufficient ductility to permit axial movement of the grid relative to the insulating discs.

References Cited in the file of this patent

UNITED STATES PATENTS 2,872,610    Hunter _____ Feb. 3, 1959